US008745192B2

(12) United States Patent
Wang

(10) Patent No.: US 8,745,192 B2
(45) Date of Patent: Jun. 3, 2014

(54) SERVER RACK SYSTEM

(75) Inventor: Hao-Hao Wang, Shanghai (CN)

(73) Assignee: Inventec Corporation, Taipei (TW)

( * ) Notice: Subject to any disclaimer, the term of this patent is extended or adjusted under 35 U.S.C. 154(b) by 116 days.

(21) Appl. No.: 13/372,201

(22) Filed: Feb. 13, 2012

(65) Prior Publication Data

US 2013/0138787 A1 May 30, 2013

(30) Foreign Application Priority Data

Nov. 28, 2011 (CN) .......................... 2011 1 0383814

(51) Int. Cl.
G06F 15/173 (2006.01)
(52) U.S. Cl.
USPC ........................................................ 709/223
(58) Field of Classification Search
USPC .................................. 709/203, 204, 223, 224
See application file for complete search history.

(56) References Cited

U.S. PATENT DOCUMENTS

| 8,325,743 B2* | 12/2012 | Shigeta et al. ................. 370/401 |
| 2003/0061382 A1* | 3/2003 | Brown et al. .................. 709/245 |
| 2005/0262218 A1* | 11/2005 | Cox et al. ....................... 709/217 |
| 2012/0136484 A1* | 5/2012 | Wang et al. .................... 700/275 |
| 2012/0136489 A1* | 5/2012 | Wang et al. .................... 700/282 |
| 2012/0137141 A1* | 5/2012 | Wang ............................. 713/300 |
| 2012/0303767 A1* | 11/2012 | Renzin .......................... 709/220 |
| 2013/0135819 A1* | 5/2013 | Wang ....................... 361/679.48 |
| 2013/0138758 A1* | 5/2013 | Cohen et al. .................. 709/212 |
| 2013/0138787 A1* | 5/2013 | Wang ............................. 709/223 |
| 2013/0138979 A1* | 5/2013 | Wang ............................. 713/300 |
| 2013/0145072 A1* | 6/2013 | Venkataraghavan et al. . 710/316 |

* cited by examiner

Primary Examiner — Lance L Barry
(74) Attorney, Agent, or Firm — CKC & Partners Co., Ltd.

(57) ABSTRACT

A server rack system includes a network switch, an Integrated Management Module (IMM) and in-rack apparatuses. The in-rack apparatuses and the IMM are connected to ports of the network switch respectively according to a preset correlation between in-rack locations and the ports of the network switch. The IMM pre-stores a correlation between identification information of the in-rack apparatuses, the in-rack locations and the ports. When the system is in operation, the IMM obtains a correlation between Media Access Control (MAC) addresses of the in-rack apparatuses and the ports from the network switch, and obtains a correlation between the identification information, the in-rack locations and the MAC addresses according to the correlation between the identification information, the in-rack locations, and the ports. The IMM obtains an Internet Protocol (IP) address corresponding to an MAC address, and uses the IP address to communicate with an in-rack apparatus in a specific rack location.

9 Claims, 2 Drawing Sheets

SERVER RACK SYSTEM

CROSS-REFERENCE TO RELATED APPLICATION

This application claims the priority benefit of China application serial no. 201110383814.4, filed on Nov. 28, 2011. The entirety of the above-mentioned patent application is hereby incorporated by reference herein and made a part of this specification.

BACKGROUND OF THE INVENTION

1. Field of the Invention

The present invention generally relates to a server, in particular, to a server rack system.

2. Description of Related Art

FIG. 1 is a schematic block diagram of a conventional server rack. A service network switch 120 and a plurality of servers 110_1 to 110_n are placed inside a rack 100. The servers 110_1 to 110_n each have a service network port. The service network ports are all connected to the service network switch 120. The servers 110_1 to 110_n are connected to the Internet 10 through the service network switch 120. The plurality of servers 110_1 to 110_n and other apparatuses are placed inside the conventional rack. Location of the large plurality of apparatuses including the servers 110_1 to 110_n is performed substantially by manual recording, which is extremely inconvenient and likely to incur mistakes. In respect of a network employing dynamic address allocation, it is very difficult for a conventional rack system to obtain Internet Protocol (IP) addresses and in-rack locations corresponding to the servers 1101 to 110_n.

SUMMARY OF THE INVENTION

Accordingly, the present invention is directed to a server rack system, so as to dynamically obtain an exact location of an apparatus in a rack and dynamically obtain Media Access Control (MAC) addresses and IP addresses of all apparatuses in the rack.

An embodiment of the present invention provides a server rack system, which includes a network switch, an Integrated Management Module (IMM), and a plurality of in-rack apparatuses. The network switch is coupled to a management network, and has a plurality of management network ports. The plurality of in-rack apparatuses is located in different locations in the server rack system respectively and each have a management network port. The in-rack apparatuses are connected to the management network ports respectively according to a preset correlation between identification information of the in-rack apparatuses, the in-rack locations and the management network ports. A management network port of the IMM is connected to the network switch, and the IMM pre-stores the correlation between the identification information of the in-rack apparatuses, the in-rack locations and the management network ports. When the system is in operation, the IMM obtains a correlation, which is generated by the network switch, between MAC addresses of the in-rack apparatuses and the management network ports, and obtains a correlation between the identification information of the in-rack apparatuses, the in-rack locations and the MAC addresses according to the correlation between the identification information of the in-rack apparatuses, the in-rack locations, and the management network ports. The IMM obtains IP addresses of the in-rack apparatuses corresponding to the MAC addresses, and communicates with an in-rack apparatus in a specific rack location by using the IP address.

Based on the above, in the server rack system according to the embodiment of the present invention, an exact location of an apparatus in the rack can be obtained dynamically by managing the servers, the fan units and the power supply unit in the rack system through the network. By querying information of the network switch, the MAC addresses and the IP addresses of all of the apparatuses in the rack can be obtained dynamically. Therefore, the IMM may communicate with an in-rack apparatus in a specific rack location by using a corresponding IP address.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
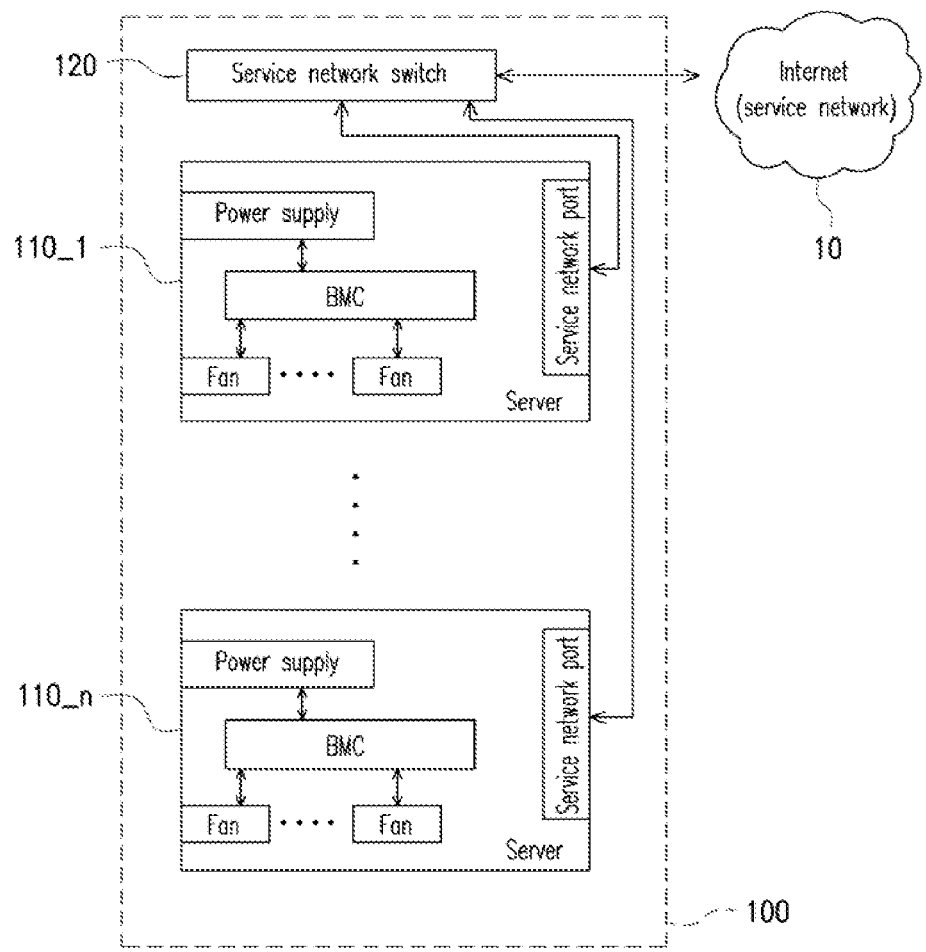
FIG. 1 is a schematic block diagram of a conventional server rack.

Reference will now be made in detail to the present embodiments of the invention, examples of which are illustrated in the accompanying drawings. Wherever possible, the same reference numbers are used in the drawings and the description to refer to the same or like parts.

So-called in-rack apparatuses include a server, a fan unit, and a power supply unit. For example, in the embodiment, a server, a fan unit, or a power supply unit is disposed in a rack.

Figure 2:
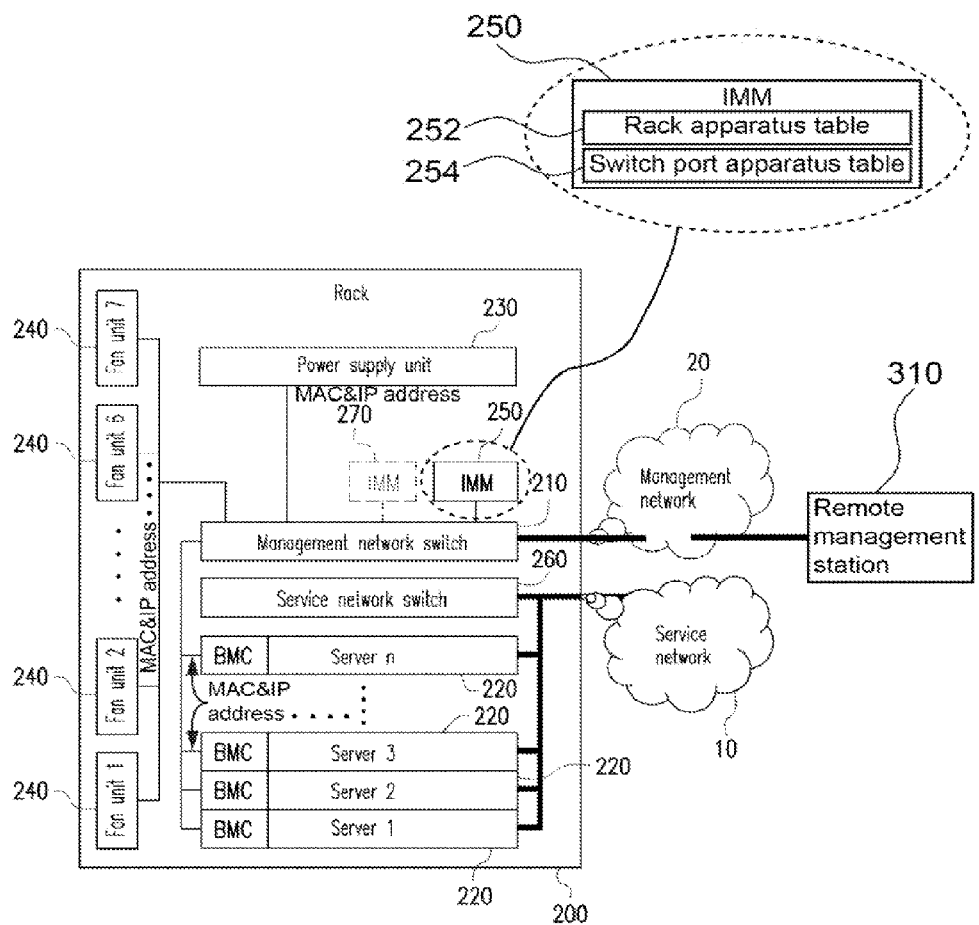
FIG. 2 is a schematic view of functional modules of a server rack system according to an embodiment of the present invention.

FIG. 2 is a schematic view of functional modules of a server rack system 200 according to an embodiment of the present invention. The server rack system 200 includes a network switch 210, a plurality of in-rack apparatuses, and an IMM 250. The network switch 210 has a plurality of management network ports. The network switch 210 is coupled to a management network 20.

In the embodiment, the plurality of in-rack apparatuses includes a plurality of servers 220, at least one power supply unit 230, a plurality of fan units 240, and a network switch 260. The in-rack apparatuses are located in different locations in the server rack system 200 respectively, and each have a management network port. The servers 220 each further have a service network port. The network switch 260 (a service network switch) has a plurality of network connection ports connected the service network ports of the servers 220 respectively. The servers 220 provide services to a service network 10 (for example, the Internet) through the network switch 260.

The servers 220 each have a baseboard management controller (BMC). The BMCs each have a management network port. The BMC is of the known technology of the server, and is not repeated herein. The management network ports of the BMCs each are connected to one of the plurality of network connection ports of the network switch 210. The network switch 210 (a management network switch) is coupled to the management network 20. The management network 20 may be a local area network (LAN) such as the Ethernet. The network switch 210 may be an Ethernet switch or other LAN switch.

The management network port of the IMM 250 is connected to the network switch 210. The IMM 250 communicates with the BMCs of the servers 220 through the network switch 210, so as to obtain operational states of the servers 220 (for example, operational states such as internal temperatures of the servers) and/or control operations of the servers 220 (for example, control operations such as the on and off of the servers, and firmware updating).

At least one power supply unit 230 is disposed in the server rack system 200. The power supply unit 230 supplies power to the server rack system 200, for example, to the network switch 210, the network switch 260, the servers 220, the fan units 240, and the IMM 250. The power supply unit 230 has a management network port. The management network port of the power supply unit 230 is connected to the network switch 210. The IMM 250 may communicate with the power supply unit 230 through the network switch 210, so as to obtain an operational state of the power supply unit 230 and/or control operation of the power supply unit 230. For example, the IMM 250 may obtain relevant power consumption information of the server rack system 200, for example an amount of power consumption of all of the servers 220, through the network switch 210. According to the power consumption information, the IMM 250 delivers a control command to the power supply unit 230 through the network switch 210, so as to control/adjust power output of the power supply unit 230.

The server rack system 200 is disposed with a plurality of fan units 240, for example, seven fan units 240 illustrated in FIG. 2. The fan units 240 each have a management network port. The management network ports of the fan units 240 are connected to the network switch 210. The IMM 250 may communicate with the fan units 240 through the network switch 210, so as to obtain an operational state of the fan units 240 (for example, to detect fan rotational speeds), or to control operation of the fan units 240 (for example, to adjust the fan rotational speeds). For example, the IMM 250 access the BMCs of the servers 220 through the network switch 210, so as to obtain temperature values of the servers 220. According to the temperature values of the servers 220, the IMM 250 delivers a control command to the fan units 240 through the network switch 210, so as to control/adjust the fan rotational speeds of the fan units 240.

In some embodiments, the IMM 250 looks into a "fan speed control table" according to the temperature values of the servers 220. The fan speed control table records a correlation between temperature values and fan rotational speeds. Therefore, the IMM 250 may obtain rotational speed values of the fan units 240 from the fan speed control table. According to the rotational speed values of the fan units 240, the IMM 250 delivers a control command to the fan units 240 through the network switch 210, so as to control/adjust the fan rotational speeds of the fan units 240.

The network switch 210 may be connected to a remote management station 310 through the management network 20. The servers 220, the power supply unit 230, and the fan units 240 each have a network interface card. That is to say, the servers 220, the power supply unit 230, and the fan units 240 each have a different MAC address and a different IP address. Therefore, the remote management station 310 may communicate with the IMM 250, the servers 220, the power supply unit 230, and/or the fan units 240 through the network switch 210. Communication performed by using the MAC address or IP address is the known technology in the field of network communication, so that communication details thereof are not repeated herein. Therefore, the remote management station 310 may obtain the operational state of the power supply unit 230 and/or the fan units 240 by accessing the IMM 250. Further, the remote management station 310 may directly access the power supply unit 230 and/or the fan units 240, without the help of the IMM 250.

In the embodiment, the in-rack apparatuses (for example, 220, 230, and 240) are connected to the management network ports of the network switch 210 respectively according to a preset correlation. For example, it is specified that the first network port of the network switch 210 must be connected to an apparatus on the first layer of the rack, and accordingly, the eighteenth network port of the network switch 210 must be connected to an apparatus on the eighteenth layer of the rack. According to a correlation between identification information of the in-rack apparatuses and in-rack locations and the management network ports, the in-rack apparatuses are connected to the management network ports of the network switch 210 respectively. The identification information of the in-rack apparatus includes at least a type and a number of the in-rack apparatus, or an MAC address, or an apparatus number, or a property number. The IMM 250 may pre-store the correlation, which is between the identification information, the in-rack location (for example a rack apparatus table) and the management network port, of the in-rack apparatuses (for example, the servers 220, the power supply unit 230, and/or the fan units 240).

When the system is in operation, the IMM 250 may access the network switch 210 through a Command Line Interface (CLI), to obtain a correlation, which is between the MAC addresses and the management network ports and generated by the network switch 210, of the in-rack apparatuses (for example, the servers, the power supply unit and/or the fan units), and obtain a correlation between the identification information of the in-rack apparatuses, the in-rack locations and the MAC addresses of the apparatus connected to the network switch 210 according to the correlation between the identification information of the in-rack apparatuses, the in-rack locations and the management network ports of the network switch 210. The CLI telnet provides a standard protocol tool for the communication between the IMM 250 and a CLI apparatus (for example a switch and a router).

In the embodiment, the correlation between the identification information of the in-rack apparatuses, the in-rack locations and the management network ports of the switch is specifically represented by two tables, one is a "rack apparatus table 252", and the other is a "switch port apparatus table 254". The rack apparatus table 252 records a correlation between the identification information of the in-rack apparatuses and the in-rack locations. For example, the "rack apparatus table 252" shown by Table 1 shows disposed locations of the in-rack apparatuses, such as the network switch 210, the servers 220, the power supply unit 230, and the fan units 240, in the server rack system 200. For example, according to the rack apparatus table 252 shown in Table 1, the No. 7 fan unit is placed on the 7-th layer on the rear side of the rack, and covers 6 layers of the servers in height. The No. 1 server is on the first layer on the front side of the rack, and covers one layer in height.

TABLE 1

Rack apparatus table

| Apparatus type | Apparatus number | Height | In-rack location | Apparatus index |
|---|---|---|---|---|
| Server | 1 | 1 | Front 1 | 1 |
| ... | ... | ... | ... | ... |
| Server | 18 | 1 | Front 18 | 18 |
| Server | 19 | 1 | Front 25 | 19 |
| ... | ... | ... | ... | ... |
| Server | 36 | 1 | Front 42 | 36 |
| Fan unit | 1 | 6 | Rear 1 | 37 |
| ... | ... | ... | ... | ... |

TABLE 1-continued

Rack apparatus table

| Apparatus type | Apparatus number | Height | In-rack location | Apparatus index |
|---|---|---|---|---|
| Fan unit | 7 | 6 | Rear 7 | 43 |
| IMM | 1 | 1 | Front 19 | 44 |
| IMM | 2 | 1 | Front 20 | 45 |
| Service network switch | 1 | 1 | Front 21 | 46 |
| Management network switch | 1 | 1 | Front 22 | 47 |
| Power supply unit | 1 | 2 | Front 23 | 48 |

Further, the "switch port apparatus table 254" records the correlation between the identification information of the in-rack apparatuses and the management network ports of the switch. It is assumed that the network switch 210 has 48 LAN ports, and the LAN ports of the network switch 210 are connected to the in-rack apparatuses, such as the servers 220, the power supply unit 230 and the fan units 240, in corresponding locations according to the "switch port apparatus table 254" shown in Table 2. For example, according to the switch port apparatus table 254, it is specified that the first network port of the network switch 210 must be connected to the No. 1 server (that is, the apparatus on the first layer of the rack), and accordingly, the 36-th network port of the network switch 210 must be connected to the No. 36 server (the apparatus on the 42-nd layer of the rack). It is specified that the 40-th network port of the network switch 210 must be connected to the IMM 250 (that is, the apparatus on the 19-th layer of the rack). It is specified that the 41-st network port of the network switch 210 must be connected to the power supply unit 230 (that is, the apparatus on the 23-rd layer of the rack).

TABLE 2

Switch port apparatus table

| Port | Apparatus type | Apparatus number |
|---|---|---|
| 1 | Server | 1 |
| ... | ... | ... |
| 36 | Server | 36 |
| 39 | | |
| 40 | IMM | 1 |
| 41 | Power supply unit | 1 |
| 42 | Fan unit | 1 |
| ... | ... | ... |
| 48 | Fan unit | 7 |

Based on the "rack apparatus table 252" shown by Table 1 and referring to the "switch port apparatus table 254" shown by Table 2, it can be known that the No. 7 fan unit is connected to the No. 48 network port of the switch 210, and the No. 1 server is connected to the No. 1 network port of the switch 210. The IMM 250 accesses the switch 210 through the CLI, so as to obtain the MAC address of the apparatus connected to the No. 48 network port of the switch 210 and the MAC address of the apparatus connected to the No. 1 network port of the switch 210. Therefore, the IMM 250 may obtain a static connection and location of each of the in-rack apparatuses (the servers 220, the fan unit 240 and/or the power supply unit 230) in the entire rack apparatus 200 according to the "rack apparatus table 252" shown by Table 1 and the "switch port apparatus table 254" shown by Table 2, so as to obtain the MAC address of each in-rack apparatus.

When the system is in operation, the IMM 250 may interact with and access the switch 210 through the CLI (for example a serial port or Telnet) of the switch 210, so as to obtain a port MAC address table (that is PORT_MAC table). The port MAC address table has a port field and an MAC address field. That is to say, the IMM 250 accesses the network switch 210 through the CLI to obtain the correlation between the MAC addresses of the in-rack apparatuses and the management network ports of the switch. For example, through the port MAC address table of the switch 210, the IMM 250 may obtain the MAC address of the apparatus connected to the No. 1 network port of the switch 210 and the MAC address of the apparatus connected to the No. 10 network port of the switch 210. The IMM 250 resolves a communication packet according to an MAC address in the port MAC address table, so as to obtain an IP address of an in-rack apparatus corresponding to the MAC address. Therefore, the IMM 250 may obtain an IP address of each of the in-rack apparatuses (the servers, the power supply unit, and the fan units).

In this way, the IMM 250 may obtain a corresponding IP address of an apparatus inserted into a specific network port of the switch 210. For example, the IMM 250 may obtain the IP address of the No. 7 fan unit 240 connected to the No. 48 network port of the switch and obtain the IP address of the No. 1 server 220 connected to the No. 1 network port. At the moment, the IMM 250 may recognize that the No. fan unit 240 and the No. 1 server 220 are in position. Therefore, the IMM 250 may communicate with the servers 220, the power supply unit 230 and/or the fan units 240 on specific rack locations by using corresponding IP addresses.

It should be noted that, the IP address may be an IP address dynamically allocated by a dynamic host configuration protocol (DHCP) server after the server rack system is started. The MAC address of each in-rack apparatus is fixed and unique, so that the IMM 250 may backward resolve a corresponding IP address by using the MAC address. In this way, according to the corresponding IP address, the IMM 250 may communicate with any one of the in-rack apparatuses (the servers 220, the fan units 240 and/or the power supply unit 230) through the network switch 210, so as to obtain the operational states of the servers 220, the fan units 240 and/or the power supply unit 230, or to control the operation of the servers 220, the fan units 240 and/or the power supply unit 230.

In another embodiment, the IMM 250 pre-stores the correlation between the identification information of the in-rack apparatuses (the servers 220, the power supply unit 230 and/or the fan units 240) and asset numbers. Referring to relevant descriptions of the aforementioned embodiments, according to the "rack apparatus table" shown by Table 1 and the "switch port apparatus table" shown by Table 2, the IMM 250 may obtain the identification information (for example, the apparatus numbers) of the in-rack apparatuses in the entire rack apparatus 200, obtain a correlation between the identification information and locations of the corresponding apparatuses in the rack, and even obtain a correlation between the identification information, the in-rack locations, and the MAC addresses. According to the correlation between the identification information, the in-rack locations, and the MAC addresses, the IMM 250 may generate a correlation between the identification information of the in-rack apparatuses, the in-rack locations, the MAC addresses and the asset numbers, and perform asset management and asset location on the in-rack apparatuses (the servers 220, the power supply unit 230 and/or fan units 240) according to the generated correlation.

According to the aforementioned operation process, when any in-rack apparatus is updated, the correlation between the identification information of the in-rack apparatus, the in-rack location and the management network port is updated first according to the "rack apparatus table" shown by Table 1 and the "switch port apparatus table" shown by Table 2, and then the IMM 250 re-accesses the network switch 210 to update the correlation between the identification information of the in-rack apparatus, the in-rack location and the MAC address. By using the MAC address, the IMM 250 may obtain an IP address of the new in-rack apparatus corresponding to the MAC address, and restore communication with the new in-rack apparatus in the specific rack location by using the IP address.

The IMM 250 may upload the correlation between the identification information of the in-rack apparatuses (the servers 220, the power supply unit 230 and/or the fan units 240), the in-rack locations, the MAC addresses and the asset numbers to the remote management station 310 through the network switch 210. When any in-rack apparatus is updated, the MAC address and the IP address of the new in-rack apparatus are also updated, so that the asset number is updated in real time. The IMM 250 may provide a specific location of the new apparatus in the rack to the remote management station 310. The IMM 250 may upload the rack apparatus table automatically or provide timely inquiry, so that a user (or the remote management station 310) may perform overall statistics on assets of a plurality of rack apparatuses. In this way, the IMM 250 may perform asset management and asset location on the servers 220, the power supply unit 230, and/or the fan units 240.

Numbering rules of the asset numbers may be determined according to requirements of an actual application scenario. In the embodiment, asset numbers of in-rack apparatuses in the same server rack system each have at least one identification bit being the same. In a machine room configured with a plurality of server rack systems, the same identification bit is used to represent the location of the server rack system in the machine room.

It should be noted that, referring to FIG. 2, it may be determined according to design requirements of an actual product whether a spare IMM 270 is disposed in the server rack system 200. The management network port of the spare IMM 270 is connected to the network switch 210. The spare IMM 270 has the same functions as the IMM 250, and may execute the same operations as the IMM 250. When the IMM 250 fails, the spare IMM 270 may replace the IMM 250 to work.

In view of the above, in the embodiment of the present invention, the IMM 250 acts as a management center of the entire rack. The IMM 250 is connected to all BMCs of the fan units 240, the power supply unit 230 and the servers 220 through the high-speed Ethernet (10/100 M). The IMM 250 obtains the temperature of each server 220 through the BMC of the server 220, calculates an optimal fan rotational speed, and then delivers a command to the fan units 240 through the management network, so as to control the fan rotational speed. Or, the IMM 250 obtains the power consumption information of each server 220 through the BMC of the server 220, so as to obtain total power consumption of all of the servers 220. According to the total power consumption, the IMM 250 delivers a command to the power supply unit 230 through the management network, so as to optimize power output of the power supply unit 230, thereby saving the energy. In some embodiments, two IMMs may be deployed in a rack, and the 1+1 redundant manner provides the entire rack with steady management. All apparatuses in the rack are connected in a full-network manner, so that the server rack system 200 has the following advantages. The speed is high (the 100 M Ethernet), the deployment is easy (only network connection is required to be changed), and location and apparatus management may be performed on each apparatus through the switch without additional hardware.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A server rack system, comprising:
a network switch, wherein the network switch is coupled to a management network and comprises a plurality of management network ports;
a plurality of in-rack apparatuses, located in different locations in the server rack system respectively and each comprising a management network port, wherein the in-rack apparatuses are connected to the management network ports of the network switch respectively according to a preset correlation between identification information of the in-rack apparatuses, the in-rack locations and the management network ports of the network switch; and
an Integrated Management Module (IMM), wherein a management network port of the IMM is connected to the network switch, the IMM pre-stores the correlation between the identification information of the in-rack apparatuses, the in-rack locations and the management network ports of the network switch; when the system is in operation, the IMM obtains a correlation, which is generated by the network switch, between Media Access Control (MAC) addresses of the in-rack apparatuses and the management network ports of the network switch, and generates a correlation between the identification information of the in-rack apparatuses, the in-rack locations and the MAC addresses according to the correlation between the identification information of the in-rack apparatuses, the in-rack locations and the management network ports of the network switch, and the IMM obtains Internet Protocol (IP) addresses of the in-rack apparatuses corresponding to the MAC addresses, and communicates with an in-rack apparatus in a specific rack location by using the IP address, wherein the correlation between the identification information of the in-rack apparatuses, the in-rack locations and the management network ports of the network switch is specifically represented by two tables; one is a rack apparatus table, the rack apparatus table records the correlation between the identification information of the in-rack apparatuses and the in-rack locations; the other is a switch port apparatus table, and the switch port apparatus table records the correlation between the identification information of the in-rack apparatuses and the management network ports of the network switch.

2. The server rack system according to claim 1, wherein the identification information of the in-rack apparatus comprises at least a type and a number of the in-rack apparatus.

3. The server rack system according to claim 1, wherein the IMM accesses the network switch through a Command Line Interface (CLI), so as to obtain the correlation between the MAC addresses of the in-rack apparatuses and the management network ports of the network switch.

4. The server rack system according to claim 1, wherein the in-rack apparatuses comprises at least one server, a fan unit and/or a power supply unit; the IMM communicates with the server, the fan unit and/or the power supply unit through the network switch according to the IP addresses, so as to obtain operation states of the server, the fan unit and/or the power supply unit, or control operation of the server, the fan unit and/or the power supply unit.

5. The server rack system according to claim 1, wherein the IP address is a dynamically allocated IP address after the server rack system is started.

6. The server rack system according to claim 1, wherein the IMM pre-stores a correlation between the identification information of the in-rack apparatuses and asset numbers, the IMM generates a correlation between the identification information of the in-rack apparatuses, the in-rack locations, the MAC addresses and the asset numbers according to the correlation between the identification information of the in-rack apparatuses, the in-rack locations and the MAC addresses, and performs asset management and asset location on the in-rack apparatuses according to the generated correlation.

7. The server rack system according to claim 6, further comprising:

a remote management station, connected to the IMM through the management network, wherein the IMM uploads the correlation between the identification information of the in-rack apparatuses, the in-rack locations, the MAC addresses and the asset numbers to the remote management station.

8. The server rack system according to claim 6, wherein the asset numbers of the in-rack apparatuses in the same server rack system comprises at least one identification bit being the same, which is used to represent a location of the server rack system in a machine room.

9. The server rack system according to claim 1, wherein when any in-rack apparatus is updated, the correlation between the identification information of the in-rack apparatus, the in-rack location and the management network port of the network switch is updated first, then the IMM accesses the network switch to update the correlation between the identification information of the in-rack apparatus, the in-rack location and the MAC address, obtains an IP address of the in-rack apparatus corresponding to the MAC address, and restores communication with the in-rack apparatus in a specific rack location by using the IP address.

* * * * *